United States Patent
Nakagawa et al.

(10) Patent No.: US 12,528,238 B2
(45) Date of Patent: Jan. 20, 2026

(54) DRIVE MECHANISM, INJECTION APPARATUS, AND INJECTION MOLDING MACHINE

(71) Applicant: THE JAPAN STEEL WORKS, LTD., Tokyo (JP)

(72) Inventors: Yutaka Nakagawa, Tokyo (JP); Yusuke Yonehara, Tokyo (JP); Toshio Toyoshima, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 222 days.

(21) Appl. No.: 18/235,828

(22) Filed: Aug. 19, 2023

(65) Prior Publication Data

US 2024/0075667 A1  Mar. 7, 2024

(30) Foreign Application Priority Data

Sep. 1, 2022  (JP) ................. 2022-139379

(51) Int. Cl.
  *B29C 45/50*  (2006.01)
(52) U.S. Cl.
  CPC .. *B29C 45/5008* (2013.01); *B29C 2045/5068* (2013.01); *B29C 2045/5088* (2013.01)
(58) Field of Classification Search
  CPC ........ B29C 45/5008; B29C 2045/5068; B29C 2045/5048
  See application file for complete search history.

(56) References Cited

U.S. PATENT DOCUMENTS

2024/0149513 A1 *  5/2024  Osawa .................... B29C 45/47

FOREIGN PATENT DOCUMENTS

| CN | 114953373 A | * | 8/2022 | ......... B29C 45/5008 |
| EP | 4059692 A2 | * | 9/2022 | ......... B29C 45/5008 |
| JP | 2019-171784 A | | 10/2019 | |
| JP | PCT/JP2022/001948 | * | 1/2022 | |

OTHER PUBLICATIONS

Beardmore, Roy, Timing Belts, 2020, <https://roymech.org/Useful_Tables/Drive/Timing_belts.html> (Year: 2020).*

* cited by examiner

*Primary Examiner* — Armand Melendez
(74) *Attorney, Agent, or Firm* — Potomac Law Group, PLLC

(57) ABSTRACT

An injection apparatus of one embodiment includes a cylinder, a screw provided inside the cylinder, and a drive mechanism configured to rotate the screw, move the screw forward, and move the screw backward. The drive mechanism includes a piston having a piston rod and a rotating body which is arranged around the piston rod and is driven to rotate around a central axis of the piston rod as a rotation axis. A plurality of external teeth extending in the direction of the central axis of the piston rod are provided on the piston rod, and a plurality of internal teeth meshing with the external teeth are provided on the rotating body. Also, the screw is non-rotatably connected to a distal end side of the piston rod.

5 Claims, 2 Drawing Sheets

DRIVE MECHANISM, INJECTION APPARATUS, AND INJECTION MOLDING MACHINE

CROSS-REFERENCE TO RELATED APPLICATION

The present application claims priority from Japanese Patent Application No. 2022-139379 filed on Sep. 1, 2022, the contents of which are hereby incorporated by reference into this application.

TECHNICAL FIELD OF THE INVENTION

The present invention relates to an injection molding machine.

BACKGROUND OF THE INVENTION

An injection molding machine configured to manufacture a resin member or a metal member with a desired shape has been known. A general injection molding machine includes a mold clamping apparatus and an injection apparatus. The mold clamping apparatus holds molds and is configured to open and close the held molds. The injection apparatus is configured to melt a resin material or a metal material and supply the molten material to the mold clamping apparatus (see, for example, Japanese Unexamined Patent Application Publication No. 2019-171784 (Patent Document 1)).

SUMMARY OF THE INVENTION

The injection apparatus includes a cylinder, a screw, a drive mechanism, and the like. The drive mechanism rotates the screw, moves the screw forward, and moves the screw backward inside the cylinder. In order to reduce the manufacturing cost and size of the injection apparatus and the injection molding machine, there is a demand for reducing the number of components and size of the drive mechanism provided in the injection apparatus.

Other objects and novel features will be apparent from the description of this specification and the accompanying drawings.

An injection apparatus of one embodiment includes a cylinder, a screw provided inside the cylinder, and a drive mechanism configured to rotate the screw, move the screw forward, and move the screw backward. The drive mechanism includes a piston having a piston rod and a rotating body which is arranged around the piston rod and is driven to rotate around a central axis of the piston rod as a rotation axis. A plurality of external teeth extending in the direction of the central axis of the piston rod are provided on the piston rod, and a plurality of internal teeth meshing with the external teeth are provided on the rotating body. Also, the screw is non-rotatably connected to a distal end side of the piston rod.

According to one embodiment, it is possible to reduce the manufacturing cost and size of the injection apparatus and the injection molding machine.

BRIEF DESCRIPTIONS OF THE DRAWINGS

Figure 1:
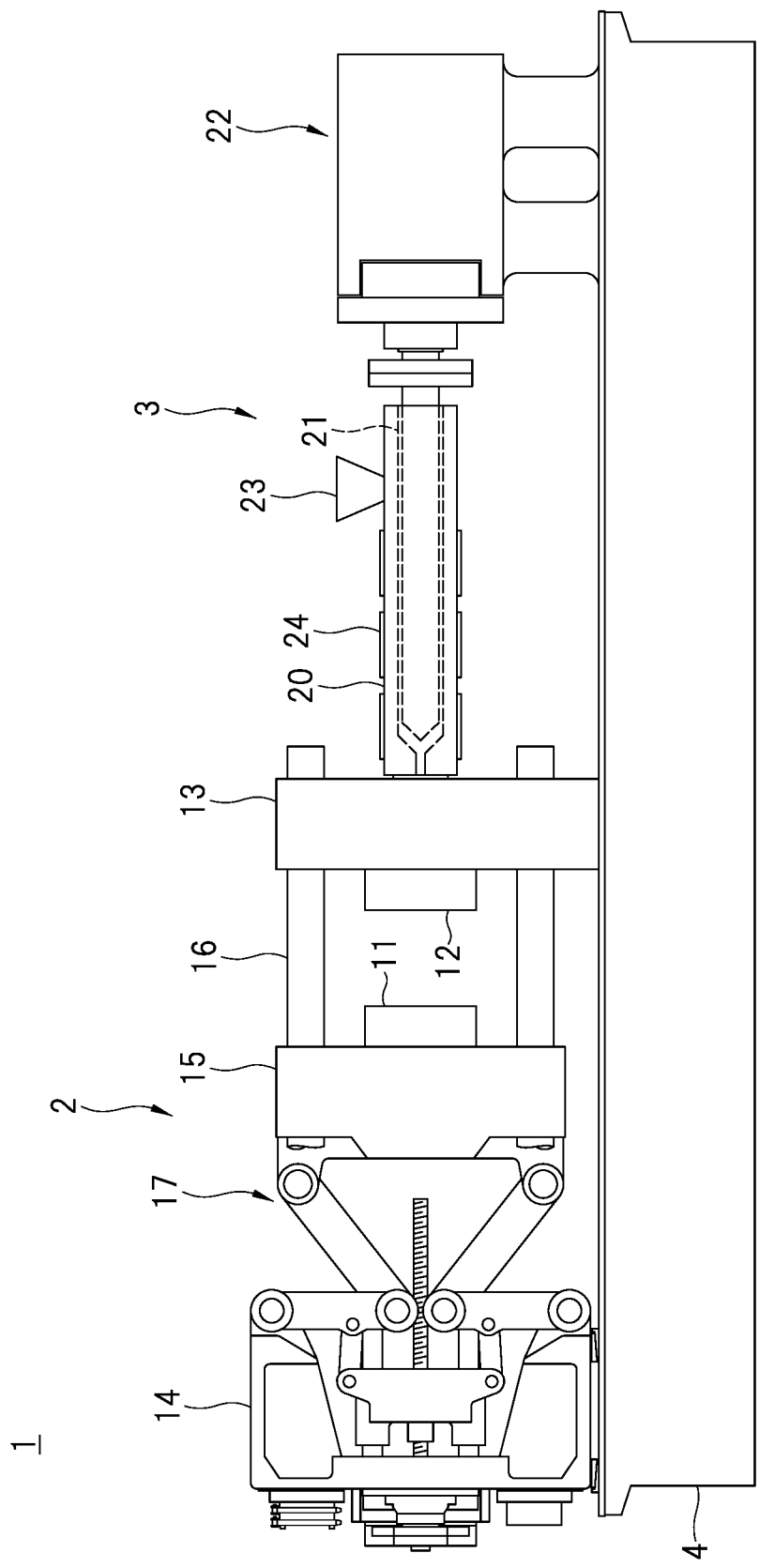
Figure 2:
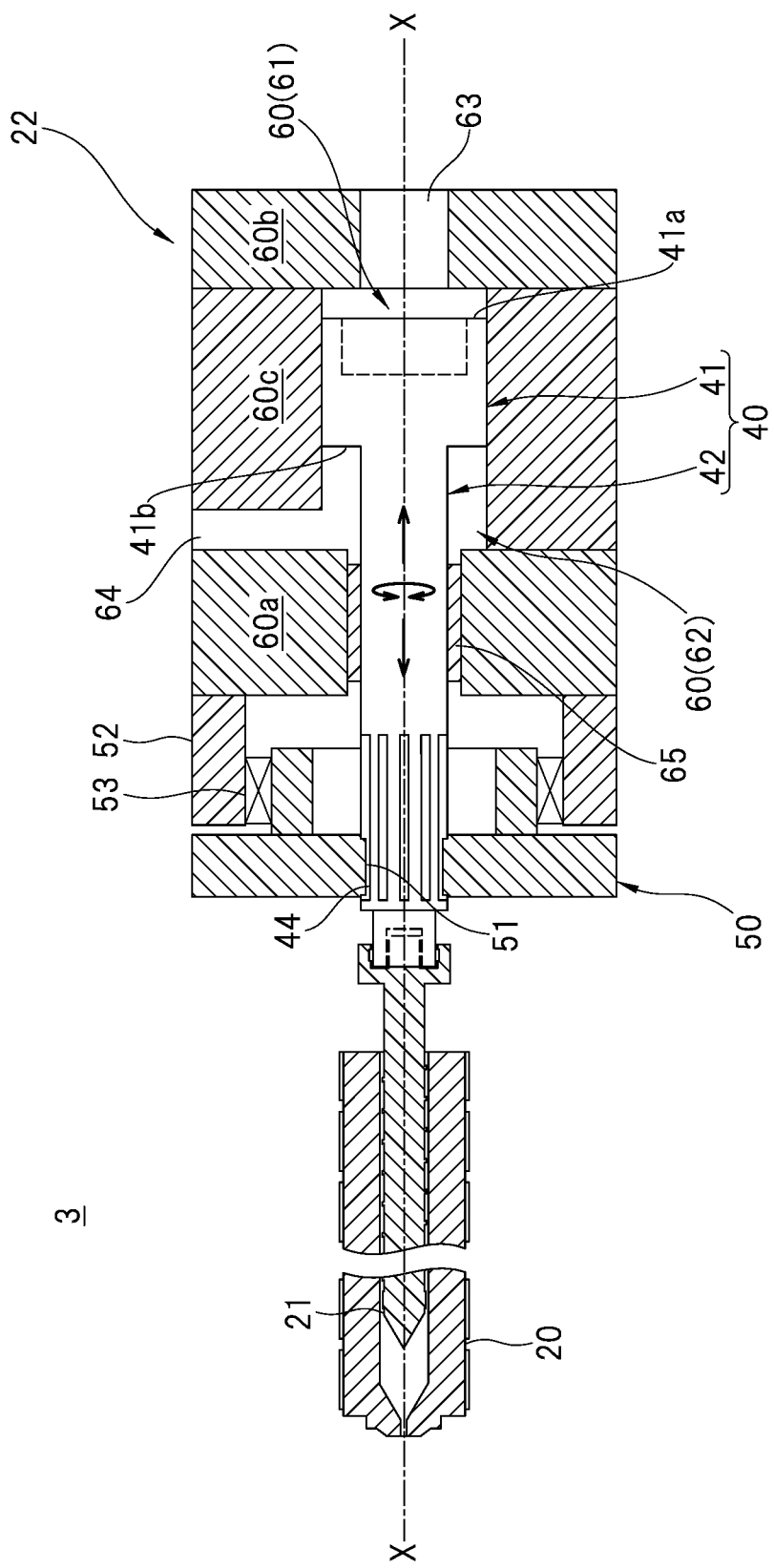

FIG. 1 is an explanatory diagram schematically showing an injection molding machine according to an embodiment; and FIG. 2 is an explanatory diagram schematically showing an injection apparatus according to the embodiment.

DESCRIPTIONS OF THE PREFERRED EMBODIMENTS

Hereinafter, an embodiment will be described in detail with reference to drawings. Note that the members and devices having the same or substantially same function are denoted by the same reference characters throughout the drawings for describing the embodiment. Also, the repetitive description of the members and devices that have been described once will be omitted.

Injection Molding Machine

FIG. 1 is an explanatory diagram schematically showing an injection molding machine 1 according to the present embodiment. The injection molding machine 1 includes a mold clamping apparatus 2 and an injection apparatus 3. Molds 11 and 12 are attached to the mold clamping apparatus 2. The mold clamping apparatus 2 opens and closes the attached molds 11 and 12. The injection apparatus 3 heats a material (for example, metal material such as magnesium or magnesium alloy) into a molten or semi-molten state. Further, the injection apparatus 3 supplies the metal material in the molten or semi-molten state (molten metal) to the mold clamping apparatus 2. More specifically, the injection apparatus 3 injects the molten metal into a cavity of the molds 11 and 12. Namely, the injection molding machine 1 according to the present embodiment is a metal injection molding machine.

Mold Clamping Apparatus

The mold clamping apparatus 2 includes a fixed platen 13, a mold clamping housing 14, and a movable platen 15 provided on a bed 4. The fixed platen 13 is fixed to the bed 4. On the other hand, the mold clamping housing 14 and the movable platen 15 are slidable on the bed 4.

The fixed platen 13 and the mold clamping housing 14 are connected to each other by a plurality of tie bars 16 passing through the movable platen 15. More specifically, the fixed platen 13 and the mold clamping housing 14 are connected by the four tie bars 16. The movable platen 15 is slidable between the fixed platen 13 and the mold clamping housing 14 in the opposing direction thereof.

A mold clamping mechanism 17 is provided between the mold clamping housing 14 and the movable platen 15. More specifically, the link-type mold clamping mechanism 17 is provided between the mold clamping housing 14 and the movable platen 15. From another point of view, a toggle mechanism is provided between the mold clamping housing 14 and the movable platen 15. Note that the mold clamping mechanism 17 may be replaced with a direct-pressure type.

The mold clamping mechanism 17 moves the mold 11 attached to the movable platen 15 forward and backward with respect to the mold 12 attached to the fixed platen 13. When the mold 11 comes in contact with the mold 12, the molds 11 and 12 are closed. On the other hand, when the mold 11 is separated from the mold 12, the molds 11 and 12 are opened. The mold clamping mechanism 17 can press the mold 11 to the mold 12 such that the molds 11 and 12 do not open while the molds 11 and 12 are closed.

Injection Apparatus

The injection apparatus 3 includes a cylinder 20, a screw 21, a drive mechanism 22, a hopper 23, and the like. The hopper 23 is a supply port for supplying a metal material into the cylinder 20 and is provided on a rear part of the cylinder 20. The screw 21 is provided inside the cylinder 20, and rotates and moves with respect to the cylinder 20. More specifically, the screw 21 is driven to rotate around a central axis of the cylinder as a rotation axis. Further, the screw 21 is linearly driven in the direction of the central axis of the cylinder 20. From another point of view, the screw 21 is linearly driven inside the heating cylinder 20 in the direction toward the mold clamping apparatus 2 (forward direction) and the direction away from the mold clamping apparatus 2 (backward direction).

The above-described operations (rotation, forward movement, backward movement) of the screw 21 are realized by the drive mechanism 22. Details of the drive mechanism 22 will be described later.

The metal material supplied into the cylinder 20 through the hopper 23 is melted by heating. A heater for heating the cylinder 20 is provided around the cylinder 20. In the present embodiment, a plurality of heaters 24 are wound around the outer peripheral surface of the cylinder 20. The metal material supplied into the cylinder 20 is heated and melted by the heat generated from the heaters 24 and the shear heat generated by the rotation of the screw 21.

Method of Manufacturing Molded Product

The process of manufacturing a molded product such as a metal member by using the injection molding machine 1 shown in FIG. 1 is the same or substantially same as the well-known process. Therefore, the detailed description of the manufacturing process is omitted, but the manufacturing process includes one or two or more steps of the following steps.

(Step 1) A step of heating a metal material (for example, magnesium or magnesium alloy processed into powder or pellets) supplied into the cylinder 20 into a molten or semi-molten state.

(Step 2) A step of rotating the screw 21 to send the metal material in the molten or semi-molten state to a distal end side of the cylinder 20.

(Step 3) A step of moving the screw 21 forward to inject the metal material into a cavity of the molds 11 and 12 from an injection nozzle.

(Step 4) A step of moving the screw 21 backward to relieve the pressure of the metal material in the injection nozzle.

By repeating the process including one or two or more steps of the steps described above, metal members (molded products) with the same shape are continuously manufactured. Namely, the metal members (molded products) with a desired shape are mass-produced.

Drive Mechanism

FIG. 2 is an explanatory diagram schematically showing the injection apparatus 3. As described above, the injection apparatus 3 includes the drive mechanism 22 configured to rotate the screw 21, move the screw 21 forward, and move the screw 21 backward. The drive mechanism 22 includes a piston 40 and a rotating body 50.

Piston

The piston 40 includes a piston head 41 and a piston rod 42 integrated with each other and is hydraulically moved in a direction of a central axis of the piston rod 42. Namely, the piston 40 is a hydraulic piston. Note that the line X-X in FIG. 2 is a virtual line indicating the central axis of the piston rod 42.

From another point of view, the piston 40 moves in the direction toward the mold clamping apparatus 2 shown in FIG. 1 (forward direction) and the direction away from the mold clamping apparatus 2 (backward direction). The screw 21 is non-rotatably connected to a distal end side of the piston rod 42 of the piston 40. Therefore, when the piston 40 moves back and forth, the screw 21 also moves back and forth. More specifically, when the piston 40 moves forward, the screw 21 also moves forward. On the other hand, when the piston 40 moves backward, the screw 21 also moves backward.

The piston 40 is moved forward, for example, when executing Step 3 above. In other words, in Step 3 above, the piston 40 is moved forward to move the screw 21 forward, thereby injecting the metal material from the injection nozzle.

The piston 40 is moved backward, for example, when executing Step 4 above. In other words, in Step 4 above, the piston 40 is moved backward to move the screw 21 backward, thereby relieving the pressure of the metal material in the injection nozzle. By relieving the pressure of the metal material in the injection nozzle, leakage of the metal material is prevented. The Step 4 above in which the screw 21 is moved backward in order to prevent the leakage of the metal material is sometimes referred to as "suckback".

Piston Head

The piston head 41 is housed in a hydraulic chamber 60 surrounded by a front wall 60a, a rear wall 60b, and side walls 60c. The piston head 41 can move forward and backward and rotate inside the hydraulic chamber 60.

The hydraulic chamber 60 is divided into an upper chamber 61 and a lower chamber 62 by the piston head 41. From another point of view, the space behind (on the right side of) the piston head 41 is the upper chamber 61, and the space in front of (on the left side of) the piston head 41 is the lower chamber 62. Note that the volumes of the upper chamber 61 and the lower chamber 62 increase and decrease as the piston head 41 moves.

The hydraulic chamber 60 is connected to a hydraulic system via two ports 63 and 64. When hydraulic oil is supplied from the port 63 to the upper chamber 61, a pressure is applied to an upper surface 41a of the piston head 41, and the piston 40 moves forward (the piston 40 is pushed out). At this time, hydraulic oil in the lower chamber 62 is discharged from the lower chamber 62 through the port 64.

On the other hand, when hydraulic oil is supplied from the port 64 to the lower chamber 62, a pressure is applied to a lower surface 41b of the piston head 41, and the piston 40 moves backward (the piston 40 is pushed back). At this time, hydraulic oil in the upper chamber 61 is discharged from the upper chamber 61 through the port 63.

Piston Rod

The piston rod 42 has a columnar shape and extends forward from the lower surface 41b of the piston head 41. From another point of view, the piston head 41 is provided on a proximal end side of the piston rod 42. In other words, the side where the piston head 41 is provided is the proximal end side of the piston rod 42. Also, the side opposite to the side where the piston head 41 is provided is the distal end side of the piston rod 42. Note that the piston head 41 and the piston rod 42 are coaxial with each other.

The piston rod 42 penetrates the front wall 60a and protrudes forward from the front wall 60a. A seal member 65 for preventing leakage of hydraulic oil is arranged between the front wall 60a and the piston rod 42.

A plurality of external teeth 44 are provided on an outer peripheral surface of the piston rod 42. More specifically, the plurality of external teeth 44 are provided on the outer peripheral surface of the piston rod 42 on the distal end side protruding from the front wall 60a.

Each external tooth 44 extends in the direction of the central axis of the piston rod 42. Also, the plurality of external teeth 44 are adjacent in the circumferential direction of the piston rod 42 and parallel to each other. Furthermore, each external tooth 44 is designed to have a length such that the rear end thereof does not reach the seal member 65 even when the piston 40 moves to the rearmost position. From another point of view, each external tooth 44 is arranged at a position where the rear end thereof does not reach the seal member 65 even when the piston 40 moves to the rearmost position.

Rotating Body

The rotating body 50 is arranged around the piston rod 42 and surrounds the piston rod 42. Namely, the rotating body 50 is an annular or cylindrical member having an inner diameter through which the piston rod 42 can be inserted.

The rotating body 50 is arranged on a front side of the injection apparatus 3. More specifically, the rotating body 50 is arranged between the proximal end and the distal end of the piston rod 42 in the direction of the central axis of the piston rod 42. From another point of view, the rotating body 50 is arranged in front of the piston head 41 and behind the screw 21.

A plurality of internal teeth 51 are provided on an inner peripheral surface of the rotating body 50 facing the outer peripheral surface of the piston rod 42. Each internal tooth 51 extends in the same direction as the external tooth 44. In addition, the plurality of internal teeth 51 are adjacent to each other in the circumferential direction (rotation direction) of the rotating body 50 and parallel to each other.

The internal teeth 51 provided on the rotating body 50 mesh with the external teeth 44 provided on the piston rod 42. Namely, the piston rod 42 and the rotating body 50 are spline-fitted. From another point of view, the piston rod 42 is a spline shaft with a key formed on its outer peripheral surface, and the rotating body 50 is a spline boss or sleeve with a key groove formed on its inner peripheral surface.

The external teeth 44 provided on the piston rod 42 and the internal teeth 51 provided on the rotating body 50 extend in the direction of the central axis of the piston rod 42 and mesh with each other. As a result, the piston 40 and the rotating body 50 cannot rotate relative to each other, but the piston 40 can move in the direction of the central axis of the piston rod 42 with respect to the rotating body 50. Namely, the piston 40 can rotate integrally with the rotating body 50 and can move back and forth independently of the rotating body 50.

The rotating body 50 is rotatably attached via a bearing 53 to a support portion 52 protruding from a front surface of the front wall 60a. The rotating body 50 is driven to rotate by a motor around the central axis of the piston rod 42 as a rotation axis. For example, torque output from an electric motor is input to the rotating body 50 via transmission means and deceleration means composed of belts, pulleys, gears, and the like. The torque input to the rotating body 50 is transmitted to the piston rod 42 and rotates the piston 40 including the piston rod 42. Note that the motor is not limited to an electric motor, and may be, for example, a hydraulic motor.

As described above, the screw 21 is non-rotatably connected to the distal end side of the piston rod 42. Therefore, when the piston 40 rotates, the screw 21 also rotates. More specifically, when the piston 40 rotates clockwise, the screw 21 also rotates clockwise. On the other hand, when the piston 40 rotates counterclockwise, the screw 21 also rotates counterclockwise. The rotation direction of the piston 40 is switched by switching the rotation direction of the rotating body 50, and the rotation direction of the rotating body 50 is switched by switching the rotation direction of the motor.

The piston 40 is rotated, for example, when executing Step 1 or Step 2 above. Namely, in Step 1 above, the piston 40 is rotated to rotate the screw 21, thereby applying shear stress to the metal material. Further, in step 2 above, the piston 40 is rotated to rotate the screw 21, thereby sending the metal material to the distal end side of the cylinder 20.

As described above, in the injection apparatus 3 of the present embodiment, one piston 40 takes on all the operations (rotation, forward movement, and backward movement) of the screw 21. Therefore, the number of components of the injection apparatus 3 is smaller than that of other injection apparatuses in which the operations of the screw 21 are shared by a plurality of pistons, and the injection apparatus 3 can be manufactured at lower cost. Furthermore, the reduction in manufacturing cost of the injection apparatus 3 leads to the reduction in manufacturing cost of the injection molding machine 1 including the injection apparatus 3.

In addition, when the number of components is reduced, the joints and fastening points between components are also reduced. As a result, the risk of deformation or breakage of bolts and other joint members and fastening members is reduced.

Further, in the injection apparatus 3 of the present embodiment, members that move when the screw 21 moves forward and backward are only the screw 21 and the piston 40. From another point of view, the rotating body 50 does not move when the screw 21 moves forward and backward. Therefore, the weight to be moved forward and backward is small, and the braking performance of the screw 21 is improved. In other words, the braking distance of the screw 21 can be shortened, and the screw 21 can be accurately stopped at a desired position.

Furthermore, in the injection apparatus 3 of the present embodiment, the rotating body 50 is arranged on the front side of the apparatus, and the external teeth 44 that mesh with the internal teeth 51 of the rotating body 50 are provided on the distal end side of the piston rod 42. On the other hand, if the rotating body 50 is arranged on the rear side of the apparatus, the piston rod 42 and the piston head 41 must be extended backward, and the external teeth 44 must be provided on the proximal end side of the piston rod 42 and behind the piston head 41. In this case, the entire length of the injection apparatus 3 is extended and the size of the injection apparatus 3 is increased. Furthermore, the increase in size of the injection apparatus 3 leads to the increase in size of the injection molding machine 1 including the injection apparatus 3. Namely, in the present embodiment, the size reduction of the injection apparatus 3 and the injection molding machine 1 is realized.

In the foregoing, the invention made by the inventors of this application has been concretely described based on the embodiment. However, it is needless to say that the present invention is not limited to the above-described embodiment and various modifications can be made within the range not departing from the gist thereof. For example, the injection apparatus 3 can be replaced with an injection apparatus (resin injection apparatus) configured to inject molten resin into the molds 11 and 12 attached to the mold clamping apparatus 2.

What is claimed is:

1. A drive mechanism configured to drive a screw of an injection apparatus, the drive mechanism comprising:
    a piston which includes a piston rod and a piston head provided on a proximal end side of the piston rod and is hydraulically moved in a direction of a central axis of the piston rod; and
    a rotating body which is arranged around the piston rod and is driven to rotate around the central axis of the piston rod as a rotation axis, and is not moved in the direction of the central axis of the piston rod,
    wherein a plurality of external teeth extending in the direction of the central axis of the piston rod are provided on an outer peripheral surface of the piston rod,
    wherein a plurality of internal teeth meshing with the external teeth are provided on an inner peripheral surface of the rotating body facing the outer peripheral surface of the piston rod,
    wherein the screw is non-rotatably connected to a distal end side of the piston rod,
    wherein the piston rod has a columnar shape,
    wherein the rotating body has an annular or cylindrical shape surrounding the piston rod and is coaxial with the piston rod, and
    wherein the piston rod and the rotating body are spline-fitted such that the rotating body and the screw integrally rotate when the screw rotates and the rotating body does not move when the screw moves back and forth.

2. The drive mechanism according to claim 1,
    wherein the plurality of external teeth are adjacent in a circumferential direction of the piston rod and parallel to each other, and
    wherein the plurality of internal teeth are adjacent in a circumferential direction of the rotating body and parallel to each other.

3. The drive mechanism according to claim 1,
    wherein the rotating body is arranged between a proximal end and a distal end of the piston rod in the direction of the central axis of the piston rod.

4. An injection apparatus configured to melt a material and inject the molten material, the injection apparatus comprising:
    a cylinder;
    a screw provided inside the cylinder; and
    a drive mechanism configured to rotate the screw, move the screw forward, and move the screw backward,
    wherein the drive mechanism includes:
        a piston which includes a piston rod and a piston head provided on a proximal end side of the piston rod and is hydraulically moved in a direction of a central axis of the piston rod; and
        a rotating body which is arranged around the piston rod and is driven to rotate around the central axis of the piston rod as a rotation axis, and is not moved in the direction of the central axis of the piston rod,
    wherein a plurality of external teeth extending in the direction of the central axis of the piston rod are provided on an outer peripheral surface of the piston rod,
    wherein a plurality of internal teeth meshing with the external teeth are provided on an inner peripheral surface of the rotating body facing the outer peripheral surface of the piston rod,
    wherein the screw is non-rotatably connected to a distal end side of the piston rod,
    wherein the piston rod has a columnar shape,
    wherein the rotating body has an annular or cylindrical shape surrounding the piston rod and is coaxial with the piston rod, and
    wherein the piston rod and the rotating body are spline-fitted such that the rotating body and the screw integrally rotate when the screw rotates and the rotating body does not move when the screw moves back and forth.

5. An injection molding machine comprising:
    a mold clamping apparatus to which molds can be attached; and
    an injection apparatus configured to inject a material into the molds,
    wherein the injection apparatus includes:
        a cylinder;
        a screw provided inside the cylinder; and
        a drive mechanism configured to rotate the screw, move the screw forward, and move the screw backward,
    wherein the drive mechanism includes:
        a piston which includes a piston rod and a piston head provided on a proximal end side of the piston rod and is hydraulically moved in a direction of a central axis of the piston rod; and
        a rotating body which is arranged around the piston rod and is driven to rotate around the central axis of the piston rod as a rotation axis, and is not moved in the direction of the central axis of the piston rod,
    wherein a plurality of external teeth extending in the direction of the central axis of the piston rod are provided on an outer peripheral surface of the piston rod,
    wherein a plurality of internal teeth meshing with the external teeth are provided on an inner peripheral surface of the rotating body facing the outer peripheral surface of the piston rod,
    wherein the screw is non-rotatably connected to a distal end side of the piston rod,
    wherein the piston rod has a columnar shape,
    wherein the rotating body has an annular or cylindrical shape surrounding the piston rod and is coaxial with the piston rod, and
    wherein the piston rod and the rotating body are spline-fitted such that the rotating body and the screw integrally rotate when the screw rotates and the rotating body does not move when the screw moves back and forth.

* * * * *